(12) United States Patent
Baba

(10) Patent No.: US 11,360,358 B2
(45) Date of Patent: Jun. 14, 2022

(54) METHOD FOR ATTACHING ELECTRODE TO LIQUID CRYSTAL ELEMENT

(71) Applicant: KYUSHU NANOTEC OPTICS CO., LTD., Oita (JP)

(72) Inventor: Junichi Baba, Oita (JP)

(73) Assignee: KYUSHU NANOTEC OPTICS CO., LTD., Oita (JP)

( * ) Notice: Subject to any disclaimer, the term of this patent is extended or adjusted under 35 U.S.C. 154(b) by 0 days.

(21) Appl. No.: 17/424,168

(22) PCT Filed: Jan. 21, 2019

(86) PCT No.: PCT/JP2019/001666
§ 371 (c)(1),
(2) Date: Jul. 20, 2021

(87) PCT Pub. No.: WO2020/152749
PCT Pub. Date: Jul. 30, 2020

(65) Prior Publication Data
US 2022/0100019 A1    Mar. 31, 2022

(51) Int. Cl.
*G02F 1/1345* (2006.01)
*G02F 1/1343* (2006.01)

(52) U.S. Cl.
CPC ........ *G02F 1/13439* (2013.01); *G02F 1/1345* (2013.01)

(58) Field of Classification Search
CPC ........................... G02F 1/13439; G02F 1/1345
See application file for complete search history.

(56) References Cited

U.S. PATENT DOCUMENTS

2013/0021385 A1* 1/2013 Hou ..................... G09G 3/3659
345/92
2017/0357121 A1  12/2017 Cho et al.

FOREIGN PATENT DOCUMENTS

| JP | 4060249 | 3/2008 |
|---|---|---|
| JP | 2010503048 | 1/2010 |
| JP | 2017181560 | 10/2017 |
| JP | 2018185368 | 11/2018 |
| TW | 201825995 | 7/2018 |

OTHER PUBLICATIONS

"International Search Report (Form PCT/ISA/210) of PCT/JP2019/001666," dated Apr. 2, 2019, with English translation thereof, pp. 1-3.

* cited by examiner

*Primary Examiner* — Anne M Hines
(74) *Attorney, Agent, or Firm* — JCIPRNET

(57) ABSTRACT

A liquid crystal layer as a member of a liquid crystal element is disposed between a first resin film substrate and a second resin film substrate. A first/second conductive film is attached to one side of the first/second resin film substrate. A blade is inserted into the liquid crystal layer. The blade is moved while being inserted in the liquid crystal layer, thus making an incision in the liquid crystal layer. Then, the incision location is widened in the first resin film substrate and in the second resin film substrate, forming an opening in the surface of the liquid crystal layer. This also forms a space inside the liquid crystal layer, allowing the opening to communicate with the space. Part of an electrode is then inserted into the space of the liquid crystal layer and the liquid crystal layer is bonded with part of the electrode.

5 Claims, 3 Drawing Sheets

METHOD FOR ATTACHING ELECTRODE TO LIQUID CRYSTAL ELEMENT

CROSS-REFERENCE TO RELATED APPLICATION

This application is a 371 application of the International PCT application serial no. PCT/JP2019/001666, filed on Jan. 21, 2019. The entirety of the above-mentioned patent application is hereby incorporated by reference herein and made a part of this specification.

FIELD OF THE INVENTION

The present invention relates to a method for attaching an electrode to a liquid crystal element. More specifically, it relates to a method for attaching an electrode to a liquid crystal element that is to be used as a light modulator, for example.

BACKGROUND ART

Liquid crystal elements such as light modulators, which allow switching between transparent and non-transparent states by controlling power current, are used in office partitionings and in home window glass and home theater video screens.

Such light modulators generally have a structure in which a liquid crystal layer is disposed between two glass panels or two films that are covered with transparent conductive films.

Applying voltage to the electrodes provided for conduction to the transparent conductive films causes the orientation of the liquid crystal molecules in the liquid crystal layer to be altered, thus allowing switching between a non-transparent state that scatters incident light and a transparent state that transmits incident light.

A variety of different technologies have been proposed for such light modulators.

For example, Patent Document 1 describes laminated glass using a light modulator, as shown in FIG. 4.

Specifically, the laminated glass 100 described in Patent Document 1 comprises a pair of glass panels (101A, 101B) facing each other, transparent interlayer films (102A, 102B) disposed on the facing surfaces of each of the glass panels (101A, 101B), and a light modulator 103 sandwiched between the interlayer films (102A, 102B).

The light modulator 103 also has a liquid crystal layer 108, a pair of PET film substrates (109A, 109B) sandwiching the liquid crystal layer 108, transparent conductive films (110A, 110B) disposed on the respective facing surfaces of the pair of PET film substrates (109A, 109B), and a transparent polymer film 105.

An electrode is also provided on the transparent conductive film 110B at a section that has been exposed by cutting off the liquid crystal layer 108, transparent conductive film 110A and PET film substrate 109A at one end of the light modulator 103.

The electrode also has a connection base comprising silver paste 111 coated on the exposed transparent conductive film 110B and copper tape 112 attached to the upper side of the silver paste 111, and a plate-shaped connector 113 with one end contact bonded with the copper tape 112 and the other end protruding out from the perimeter edge of the laminated glass 100.

The connector 113 has a lead wire 115 anchored by solder 114, which serves to provide electric power from an external power source.

CITATION LIST

Patent Documents

Patent Document 1: Japanese Patent Publication no. 4060249 (JP4060249B2)

SUMMARY OF THE INVENTION

Technical Problem

However, in the method described in Patent Document 1 in which an electrode is provided on the transparent conductive film 110B at a section that has been exposed by cutting off the liquid crystal layer 108, transparent conductive film 110A and PET film substrate 109A, the surface of the transparent conductive film 110B becomes damaged when the liquid crystal layer 108 is removed, leading to the problem of increased surface resistivity.

Another problem is that the exposed transparent conductive film 110B contacts with fats and oils, moisture and other liquids, and oxygen-containing gas, causing degradation of the transparent conductive film.

It then becomes necessary to coat the surface of the transparent conductive film with a conductive paste such as silver paste in order to lower the surface resistivity, and to carry out steps of removing the liquid crystal layer, conductive film and film substrate for electrode attachment, and coating of the conductive paste, but these steps require special technical skills and also complicate the process.

It is an object of the present invention, which has been devised in light of this situation, to provide a method for attaching an electrode to a liquid crystal element that can simplify the process.

Solution to Problem

In order to achieve this object, the method for attaching an electrode to a liquid crystal element of the present invention comprises an incision step in which an incision is made in a liquid crystal layer that is capable of being disposed between a pair of substrates to which electrically conductive films have been attached, to form an opening in the surface of the liquid crystal layer while also forming a space connecting with the opening inside the liquid crystal layer, an electrode insertion step in which at least a portion of an electrode is inserted into the space formed in the incision step, and a bonding step in which the electrode and the liquid crystal layer are bonded with at least a portion of the electrode that has been inserted into the space being sandwiched by the liquid crystal layer.

The incision step, in which an incision is made in the liquid crystal layer to form an opening in the surface of the liquid crystal layer while forming a space connecting with the opening inside the liquid crystal layer, allows the electrode to be bonded while sandwiched by the liquid crystal layer, to form a space inside the liquid crystal layer for attachment to the liquid crystal layer. Since it is not necessary to remove part of the liquid crystal layer, the thickness of the liquid crystal element is not reduced and reduction in strength of the liquid crystal element can be avoided.

Moreover, the electrode insertion step in which at least a portion of the electrode is inserted into the space formed in the incision step allows both sides of the electrode to contact with the liquid crystal layer.

As a result of the bonding step in which the electrode and liquid crystal layer are bonded with at least a portion of the electrode inserted into the space being sandwiched by the liquid crystal layer, cracking is unlikely to occur from the sections where the incision has been made in the liquid crystal layer.

In the incision step of the method for attaching an electrode to a liquid crystal element according to the present invention, a blade having a cutting edge that extends from the blade tip is inserted into the liquid crystal layer disposed between the pair of substrates, or in the liquid crystal layer before it is disposed between the pair of substrates, with the cutting edge oriented from the blade tip toward the same direction in which the substrate extends, and the blade is moved in the direction in which the cutting edge is facing while the blade is inserted to make an incision in the liquid crystal layer.

This allows a space corresponding to the size of the inserted electrode to be formed inside the liquid crystal layer.

In the incision step of the method for attaching an electrode to a liquid crystal element according to the present invention, the opening may also be formed in the surface of the liquid crystal layer in a manner approximately perpendicular to the surface of the liquid crystal layer, toward the substrate.

This allows a space for attachment of the electrode to be formed in the liquid crystal layer without damaging the conductive film or substrate.

In the method for attaching an electrode to a liquid crystal element of the present invention, the electrode may have a construction with a flat main body and a bonding agent that is disposed on the outer side of the main body and comprises a conductive substance.

This facilitates conduction between the electrode and conductive film even when the liquid crystal composition is present around the periphery of the electrode.

Thermocompression bonding between the electrode and liquid crystal layer is also facilitated.

In the method for attaching an electrode to a liquid crystal element of the present invention, the main body of the electrode may be a resin film and the conductive substance may be a conductive binder, the binder including a core material formed of graphene.

This allows the electrode to be flexible and facilitates attachment of the liquid crystal element to objects with three-dimensional shapes when the substrate of the liquid crystal element is also flexible.

Since graphene is electroconductive overall, similar to a metal, it eliminates the need to coat the core material with a metal substance.

Effects of the Invention

The method for attaching an electrode to a liquid crystal element of the present invention allows the process steps to be simplified.

DESCRIPTION OF THE EMBODIMENTS

Embodiments of the present invention will now be described with reference to the accompanying drawings for more detailed illustration of the present invention.

The method for attaching an electrode to a liquid crystal element of the present invention comprises an incision step.

The incision step is a step in which an incision is made in the liquid crystal layer to form an opening in the surface of the liquid crystal layer while also forming a space connecting with the opening, inside the liquid crystal layer.

Figure 1A:
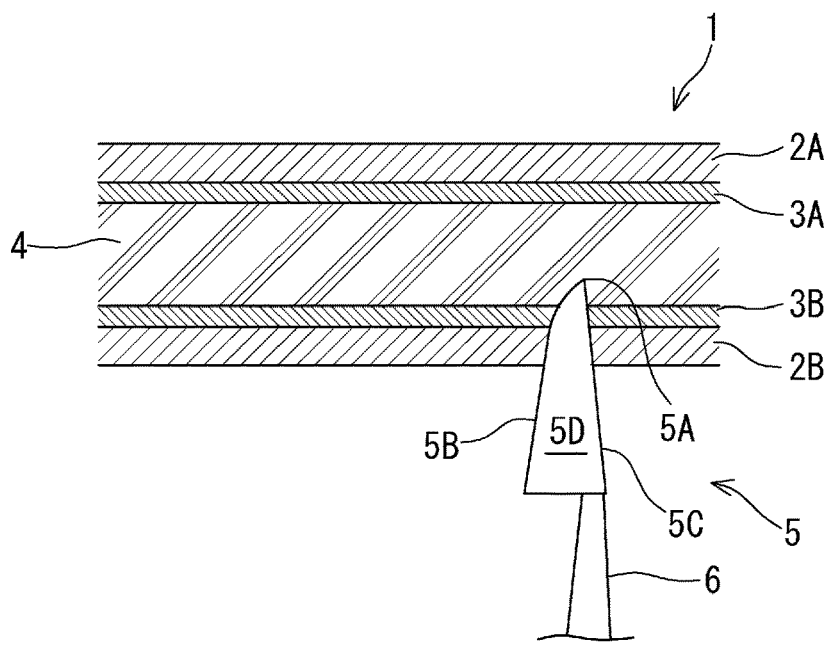
FIGS. 1A to 1C show a schematic diagram illustrating the incision step of the method for attaching an electrode to a liquid crystal element according to the present invention.

FIG. 1A is a schematic diagram showing insertion of a blade into a liquid crystal layer in the incision step of the method for attaching an electrode to a liquid crystal element according to the present invention.

Figure 1B:
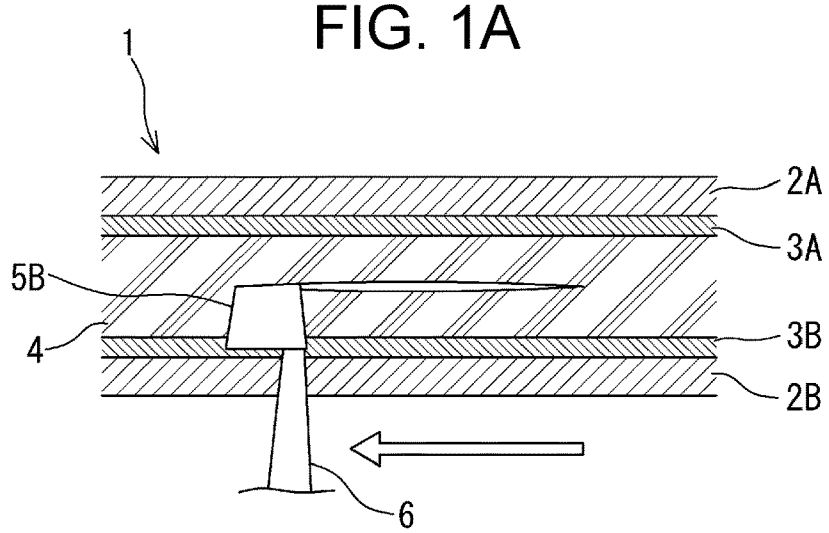

FIG. 1B is a schematic diagram showing movement of a blade that has been inserted into the liquid crystal layer and is cutting the liquid crystal layer, in the incision step of the method for attaching an electrode to a liquid crystal element according to the present invention.

Figure 1C:
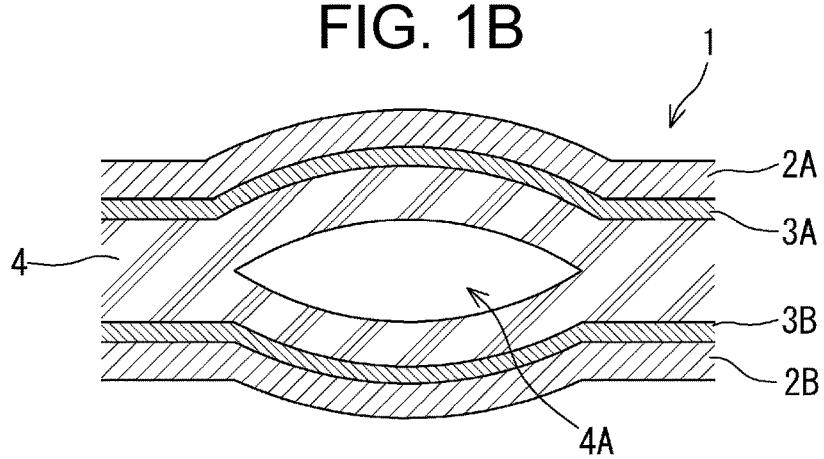

FIG. 1C is a schematic diagram showing the state where the blade has been removed from the liquid crystal layer, thus opening the liquid crystal layer, in the incision step of the method for attaching an electrode to a liquid crystal element according to the present invention.

As shown in FIG. 1A to FIG. 1C, a liquid crystal layer 4, as a member of a liquid crystal element 1, is disposed between a pair of flat substrates, i.e. a first resin film substrate 2A and a second resin film substrate 2B.

The first resin film substrate 2A and second resin film substrate 2B are each formed of a polyethylene terephthalate (PET) resin.

A first conductive film 3A is attached to one side of the first resin film substrate 2A. A second conductive film 3B is attached to one side of the second resin film substrate 2B.

As shown in FIG. 1A to FIG. 1C, the first resin film substrate 2A and second resin film substrate 2B are disposed with the first conductive film 3A and second conductive film 3B facing each other.

The material forming the conductive films may be any material with conductivity, examples of which include indium tin oxide (ITO), polyethylenedioxythiophene (PEDOT), silver nanowires and graphene.

The liquid crystal layer 4 is disposed between the first resin film substrate 2A and the second resin film substrate 2B and is anchored to the first conductive film 3A and second conductive film 3B.

As shown in FIG. 1A, a blade 5 is used to make an incision in the liquid crystal layer 4 anchored to the first conductive film 3A and second conductive film 3B.

Similar to a common blade, the blade 5 has a blade tip 5A, a cutting edge 5B extending from the blade tip 5A, a spine 5C extending from the blade tip 5A and situated at the opposite location from the cutting edge 5B, and a flat part 5D which is the region surrounded by the blade tip 5A, the cutting edge 5B and the spine 5C.

An arm 6 is attached to the side of the blade 5 opposite the blade tip 5A.

While not shown, the arm 6 is also connected to an incision device. The incision device comprises driving means to drive the arm 6, with the arm 6 being connected to the driving means.

The driving means may move the arm 6 in mm units.

By moving the arm 6 by the driving means of the incision device, it is possible to move the blade 5 that is attached to the arm 6.

The arm 6 is moved by the driving means of the incision device, causing the blade 5 to be inserted into the liquid crystal layer 4 from the blade tip 5A.

During this time, the blade 5 becomes inserted into the liquid crystal layer 4 with the cutting edge 5B oriented in the same direction as the direction in which the first resin film substrate 2A and second resin film substrate 2B extend.

The length of insertion of the blade 5 may be determined as appropriate, and as an example, the blade 5 may be inserted to a length corresponding to about ⅔ of the length between the edge of the electrode to be inserted into the liquid crystal layer 4, and the edge of the liquid crystal layer 4 that is opposite from that edge and is externally exposed when the electrode is attached.

As shown in FIG. 1B, the blade 5 is then moved in the direction in which the cutting edge 5B is facing with the blade 5 inserted into the liquid crystal layer 4, thus making an incision in the liquid crystal layer 4.

During this time, the distance that the blade 5 is moved may be determined as appropriate.

The distance that the blade 5 is moved may be a distance corresponding to the length remaining after subtracting the length between the spine 5C and cutting edge 5B of the blade 5 from the length of the electrode in the direction approximately perpendicular to the direction connecting the edge of the electrode to be inserted into the liquid crystal layer 4 and the edge on the opposite side from that edge, which is the edge of the liquid crystal layer 4 that is externally exposed when the electrode is attached.

After making the incision in the liquid crystal layer 4, the incision location is widened in the first resin film substrate 2A and in the second resin film substrate 2B, forming an opening 4A in the surface of the liquid crystal layer 4 as shown in FIG. 1C.

A space is also formed inside the liquid crystal layer 4 during this time, allowing the opening 4A to communicate with the space.

The opening 4A is also formed in the surface of the liquid crystal layer 4 that is approximately perpendicular to the surface of the liquid crystal layer 4 facing both the first resin film substrate 2A and second resin film substrate 2B.

While an incision in the liquid crystal layer through the corner of the liquid crystal layer is also possible, this will form the opening in two surfaces of the liquid crystal layer that are approximately perpendicular to the surface of the liquid crystal layer facing the substrate, which is undesirable because it results in excessive formation of the opening in the surface of the liquid crystal layer.

The method for attaching an electrode to a liquid crystal element of the present invention also comprises an electrode insertion step and a bonding step.

The electrode insertion step is a step in which at least a portion of the electrode is inserted into the space formed in the incision step.

The bonding step is a step in which the electrode and liquid crystal layer are bonded while at least a portion of the electrode inserted into the space of the liquid crystal layer is sandwiched by the liquid crystal layer.

Figure 2A:
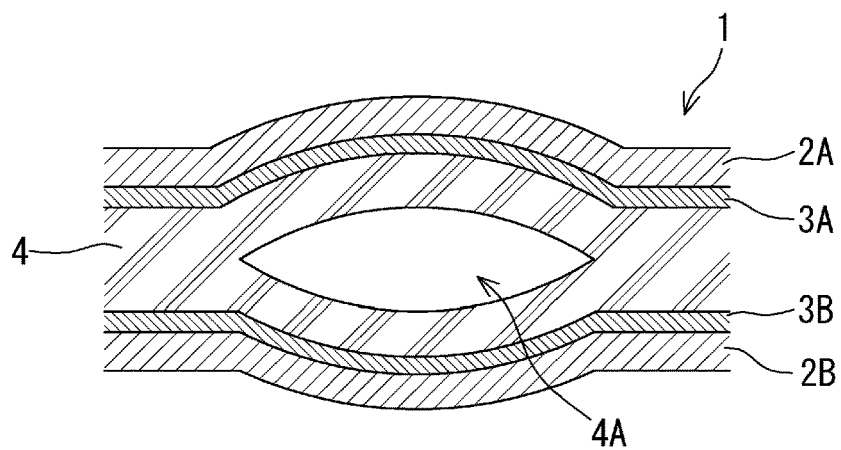
FIGS. 2A to 2C show a schematic diagram illustrating the electrode insertion step and bonding step of the method for attaching an electrode to a liquid crystal element according to the present invention.

FIG. 2A is a schematic diagram of a liquid crystal layer having an opening formed by incision for insertion of an electrode, in the electrode insertion step of the method for attaching an electrode to a liquid crystal element according to the present invention.

Figure 2B:
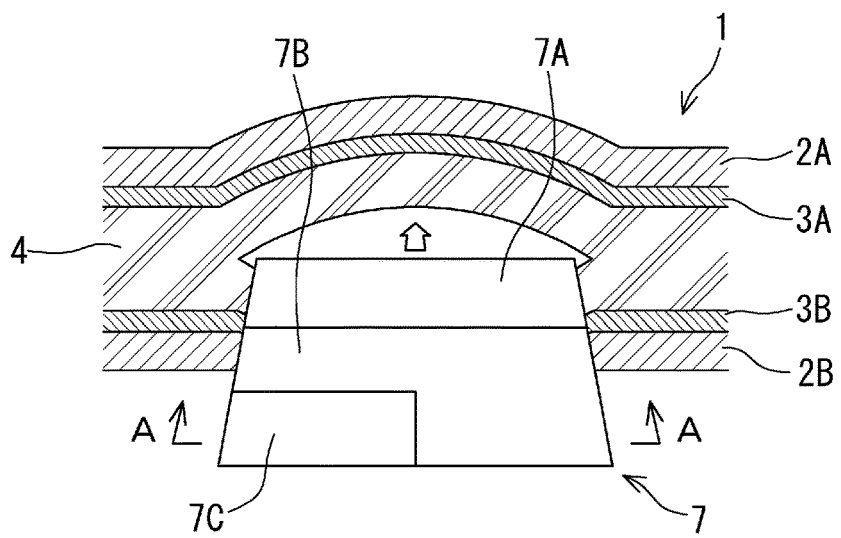

FIG. 2B is a schematic diagram showing insertion of a portion of an electrode into the space of a liquid crystal layer having an incision, in the electrode insertion step of the method for attaching an electrode to a liquid crystal element according to the present invention.

Figure 2C:
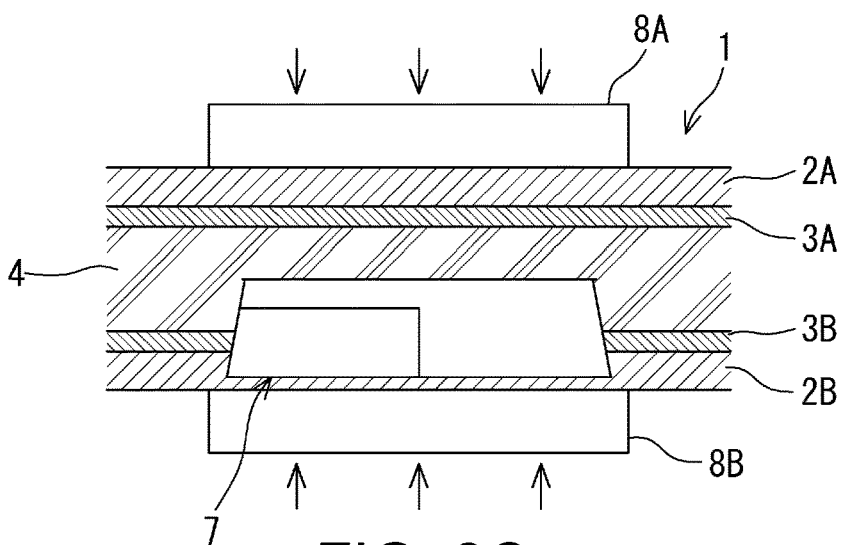

FIG. 2C is a schematic diagram showing sandwiching and contact bonding of a portion of an inserted electrode by a liquid crystal layer, in the bonding step of the method for attaching an electrode to a liquid crystal element according to the present invention.

FIG. 1 and FIG. 2 are not cross-sectional views but have diagonal lines to help more clearly indicate the respective layers.

As shown in FIG. 2A, the opening 4A is formed in the surface of the liquid crystal layer 4 by incision of the liquid crystal layer 4 for insertion of at least a portion of an electrode, forming a space connecting with the opening 4A, inside the liquid crystal layer 4.

As shown in FIG. 2B, a portion of an electrode 7 is then inserted into the space inside the liquid crystal layer 4 that was formed in the incision step.

Figure 3:
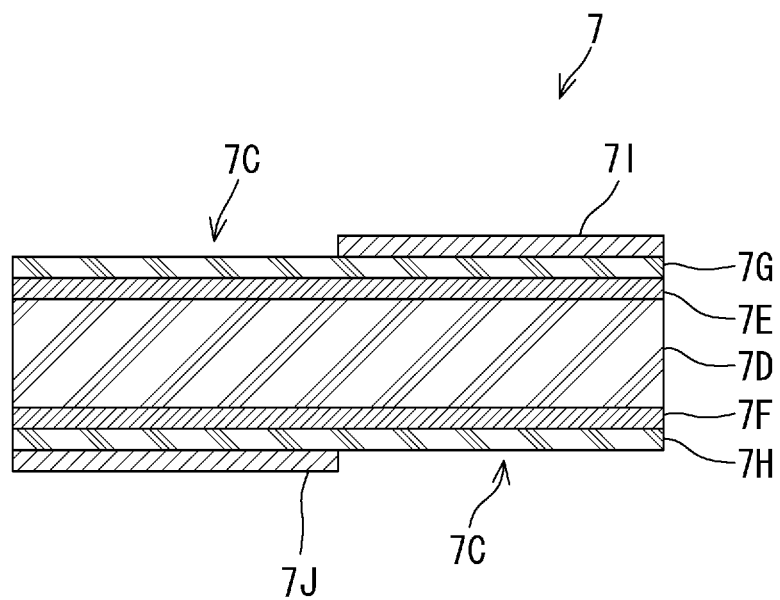
FIG. 3 is a simplified cross-sectional view of an electrode cut along line A-A shown in FIG. 2B.
Figure 4:
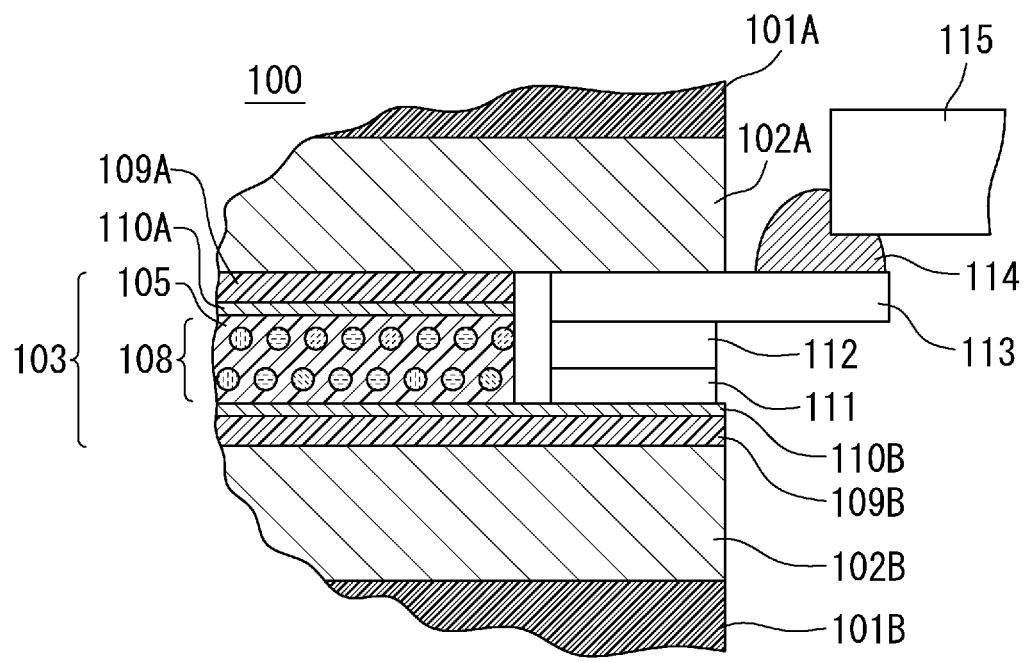
FIG. 4 is a simplified cross-sectional view of laminated glass using a conventional light modulator.

FIG. 3 is a simplified cross-sectional view of an electrode cut along line A-A shown in FIG. 2B.

The electrode 7 to be attached by the method of the present invention has a planar shape, as shown in FIG. 2B.

The electrode 7 has a resin film main body 7D with a flat shape.

The resin film main body 7D is formed of a resin film such as a polyethylene terephthalate (PET) resin film.

The electrode 7 has a first copper layer 7E with a flat shape.

The first copper layer 7E is formed of a copper foil and is attached over the entirety of one side of the resin film main body 7D.

The electrode 7 also has a second copper layer 7F with a flat shape.

The second copper layer 7F is formed of a copper foil and is attached over the entirety of the side of the resin film main body 7D opposite from the side on which the first copper layer 7E has been attached.

The electrode 7 also has a first adhesive layer 7G with a flat shape.

The first adhesive layer 7G is attached over the entirety of the side of the first copper layer 7E opposite from the side attached to the resin film main body 7D.

The electrode 7 also has a second adhesive layer 7H with a flat shape.

The second adhesive layer 7H is attached over the entirety of the side of the second copper layer 7F opposite from the side attached to the resin film main body 7D.

The first adhesive layer 7G and second adhesive layer 7H are formed of substances that soften and harden depending on temperature, and that also bond in reaction to light.

More specifically, the first adhesive layer 7G and second adhesive layer 7H are each formed of an acrylic resin or epoxy resin or a mixture thereof, for example, and have an insulating property.

The first adhesive layer 7G and second adhesive layer 7H also comprise a conductive substance.

The conductive substance is a binder with conductivity, the binder having a spherical shape with diameters of 5 to 50 µm, for example, and deforming in response to heat or pressure, or to both heat and pressure.

Specifically, the first adhesive layer 7G and second adhesive layer 7H have fine conductive particles dispersed in a film of an insulating resin material such as an acrylic resin, and application of pressure or temperature causes bonding between the first conductive film 3A and second conductive film 3B of the liquid crystal element while simultaneously allowing conduction between the first conductive film 3A and second conductive film 3B through the conductive particles.

The first adhesive layer 7G and second adhesive layer 7H are each an anisotropic conductive film (ACF) exhibiting a function of insulation in the direction approximately perpendicular to the direction in which the first conductive film 3A and the second conductive film 3B are connected.

The conductive binder includes a core material formed of a resin.

Since the core material is formed of an insulating resin, the core material is covered by one or more metal substances to provide electroconductivity to the binder.

The electrode 7 also has a first cover lay film layer 7I with a flat shape.

The first cover lay film layer 7I has an insulating property and is attached to a part of the side of the first adhesive layer 7G opposite from the side attached to the first copper layer 7E.

Specifically, as shown in FIG. 2B, the first cover lay film layer 7I is attached to approximately the center area of the first adhesive layer 7G.

Specifically, as shown in FIG. 3, the first cover lay film layer 7I is attached to approximately the center area of the first adhesive layer 7G.

As shown in FIG. 3, the first cover lay film layer 7I also extends from the approximate center area of the first adhesive layer 7G across approximately half of the region at the edge on the side opposite from the edge of the electrode 7 to be inserted into the liquid crystal layer 4.

As also shown in FIG. 3, the first cover lay film layer 7I is not attached from the approximate center area of the first adhesive layer 7G across the remaining approximate half of the region at the edge on the side opposite from the edge of the electrode 7 to be inserted into the liquid crystal layer 4, leaving the first adhesive layer 7G exposed there.

The section where the first adhesive layer 7G is exposed is an input section 7C of the electrode 7.

As also shown in FIG. 3, the first cover lay film layer 7I is not attached from the approximate center area of the first adhesive layer 7G across the edge of the electrode 7 to be inserted into the liquid crystal layer 4, leaving the first adhesive layer 7G exposed there.

The section where the first adhesive layer 7G is exposed is a conductive section 7A.

The section where the first adhesive layer 7G is exposed is a conductive section 7A.

The section sandwiched by the conductive section 7A and input section 7C is a lead section 7B.

The electrode 7 also has a second cover lay film layer 7J with a flat shape.

The second cover lay film layer 7J has an insulating property and is attached to a part of the side of the second adhesive layer 7H opposite from the side attached to the second copper layer 7F.

Specifically, the second cover lay film layer 7J is attached at approximately the center area of the second adhesive layer 7H.

The second cover lay film layer 7J also extends from the approximate center area of the second adhesive layer 7H across approximately half of the region at the edge on the side opposite from the edge of the electrode 7 to be inserted into the liquid crystal layer 4.

The second cover lay film layer 7J is not attached from the approximate center area of the second adhesive layer 7H across the remaining approximate half of the region at the edge on the side opposite from the edge of the electrode 7 to be inserted into the liquid crystal layer 4, leaving the second adhesive layer 7H exposed there.

The section where the second adhesive layer 7H is exposed is the input section 7C of the electrode 7.

As shown in FIG. 3, the section where the first adhesive layer 7G is exposed and the section where the second adhesive layer 7H is exposed are locations with mutual point symmetry.

The electrode does not necessarily need to have the structure illustrated in FIG. 3, and for example, the structure may include a formed through-hole, and it may lack the cover lay film layer on one side of the electrode and instead have the cover lay film layer disposed on the entirety of the other side opposite the one side of the electrode.

The parts of the electrode 7 that have been inserted into the space formed inside the liquid crystal layer 4, i.e., the conductive section 7A and lead section 7B of the electrode 7, are sandwiched by the liquid crystal layer 4, and the electrode 7 and liquid crystal layer 4 are bonded with the input section 7C exposed on the outside of the liquid crystal layer 4.

Specifically, as shown in FIG. 2C, a heated first heat bar 8A is contacted with the first resin film substrate 2A and pressed in the direction of the liquid crystal layer 4 while a heated second heat bar 8B is contacted with the second resin film substrate 2B and likewise pressed in the direction of the liquid crystal layer 4, thereby contact bonding together the electrode 7 and the liquid crystal layer 4.

The first adhesive layer 7G and second adhesive layer 7H of the electrode 7 become softened by the heat of the first heat bar 8A and second heat bar 8B during this time, resulting in firm bonding between the first conductive film 3A and second conductive film 3B of the liquid crystal element.

The binder of the first adhesive layer 7G and second adhesive layer 7H is also in conductive connection with the first conductive film 3A and second conductive film 3B through the liquid crystal composition of the liquid crystal layer 4.

The two input sections 7C exposed on the outside of the liquid crystal layer 4 and a power source (not shown) are conductively connected via conductor wires, allowing electric power to be supplied to the electrode.

An example of attaching an electrode to a liquid crystal layer sandwiched by conductive film-attached substrates was explained above with reference to FIG. 1 and FIG. 2, but the present invention is not limited to this construction, and for example, the electrode may be attached to the liquid crystal layer before the liquid crystal layer is sandwiched by the conductive film-attached substrates, and the liquid crystal layer to which the electrode has been attached may be sandwiched by the conductive film-attached substrates.

The substrate of the liquid crystal element does not need to be formed by a polyethylene terephthalate (PET) resin, and may instead be formed by glass, a polycarbonate (PC) resin or a polymethyl methacrylate (PMMA) resin, for example.

The electrode main body does not need to be formed of a resin film such as a polyethylene terephthalate (PET) resin film, and may instead be formed of glass or a polycarbonate (PC) resin, for example.

In addition, the electrode main body does not need to have a copper layer attached, and may instead have attachment of a member formed of another conductive substance.

The adhesive layer of the electrode does not need to be layered, and for example, it may be connected with a bonding agent member such as ACF comprising a conductive binder at the edge of the conductive layer, such as the metal layer, of the electrode when the electrode is attached to the liquid crystal layer.

The core material of the binder also does not need to be covered by a metal substance and may instead be covered by graphene, for example, as a carbon single crystal. Graphene has conductivity throughout its entirety, similar to a metal.

The core material of the binder may also be formed of graphene. The core material is preferably formed of graphene because graphene has conductivity throughout its entirety similar to a metal and thus eliminates the need to coat the core material with a metal substance.

The core material of the binder does not need to be formed of a resin, and may instead be formed of glass or a metal, for example.

In the incision step, it is not necessary for the incision to be made in the liquid crystal layer by moving the blade in the direction in which the cutting edge is oriented while the blade is inserted from the blade tip with the cutting edge oriented in the same direction in which the substrate extends, and instead, for example, a flat blade with the cutting edge having the same length or a slightly longer length than the electrode to be attached may be inserted into the liquid crystal layer to the insertion length of the electrode to make an incision in the liquid crystal layer, thereby forming the opening in the surface of the liquid crystal layer while also forming a space connecting with the opening inside the liquid crystal layer.

Moreover, a blade does not need to be used so long as an incision can be made in the liquid crystal layer to form the opening in the surface of the liquid crystal layer while also forming a space connecting with the opening inside the liquid crystal layer, and a laser, for example, may be used instead.

<Performance Evaluation Test>

There were fabricated ten liquid crystal elements with electrodes attached by the method of the present invention, and ten liquid crystal elements with electrodes attached by the method of the prior art, by removal of a portion of the liquid crystal layer or a portion of the conductive film.

The elements used as liquid crystal elements had 1000 mm widths and 2500 mm lengths.

The same conditions were used for all, except for the electrode attachment methods.

The method of the present invention was used to attach the electrodes to the liquid crystal elements in the following manner.

Specifically, as shown in FIG. 1A to FIG. 1C, an incision was made in the liquid crystal layer 4 of the liquid crystal element 1 with the blade 5 to form a 54 mm-long opening 4A in the surface of the liquid crystal layer 4.

During this time, a space with a depth of 5 mm was thus formed in communication with the opening 4A inside the liquid crystal layer 4.

Also, as shown in FIG. 2B, parts of the electrode 7, namely the conductive section 7A and lead section 7B of the electrode 7, were inserted into the space inside the liquid crystal layer 4.

Next, the conductive section 7A and lead section 7B of the electrode 7 that has been inserted into the space formed inside the liquid crystal layer 4 are sandwiched by the liquid crystal layer 4, and as shown in FIG. 2C, the first heat bar 8A that has been heated to 250° C. is contacted with the first resin film substrate 2A and pressed in the direction of the liquid crystal layer 4 while the second heat bar 8B that has also been heated to 250° C. is contacted with the second resin film substrate 2B and likewise pressed in the direction of the liquid crystal layer 4, for thermocompression bonding of the electrode 7 and liquid crystal layer 4.

The method of the prior art was used to attach the electrodes to the liquid crystal elements in the following manner.

Specifically, an alcohol solvent was used to remove part of one resin film substrate of the liquid crystal element, part of one conductive film attached to the resin film substrate, and part of the liquid crystal layer contacting with the conductive film.

Next, silver paste was coated onto the other exposed conductive film and an electrode similar to the electrode 7 was attached to the silver paste.

Each of the liquid crystal elements with electrodes attached in this manner were measured for surface resistivity of the conductive film.

The results are shown in Table 1. The surface resistivity of each conductive film before attachment of the electrode was 150 $\Omega$/sq.

TABLE 1

|  | Present invention method ($\Omega$/sq.) | Prior art method ($\Omega$/sq.) |
| --- | --- | --- |
| Liquid crystal element 1 | 152 | 223 |
| Liquid crystal element 2 | 152 | 218 |
| Liquid crystal element 3 | 151 | 234 |
| Liquid crystal element 4 | 154 | 231 |
| Liquid crystal element 5 | 151 | 180 |
| Liquid crystal element 6 | 153 | 196 |
| Liquid crystal element 7 | 151 | 209 |
| Liquid crystal element 8 | 153 | 235 |
| Liquid crystal element 9 | 153 | 220 |
| Liquid crystal element 10 | 152 | 227 |

As seen from Table 1, the surface resistivity of the conductive film of each liquid crystal element having electrodes attached by the method of the present invention was 151 to 153 $\Omega$/sq. while the surface resistivity of the conductive film of each liquid crystal element having electrodes attached by the method of the prior art was 180 to 235 $\Omega$/sq., thus demonstrating that damage was caused in the conductive film by the prior art method.

Each of the electrode-attached liquid crystal elements was also subjected to a R10 mandrel test. The liquid crystal elements with electrodes attached by the method of the present invention were measured for surface resistivity of the conductive film after bending 500 times, and the liquid crystal elements with electrodes attached by the method of the prior art were measured for surface resistivity of the conductive film after bending 150 times.

The results are shown in Table 2.

TABLE 2

|  | Present invention method ($\Omega$/sq.) | Prior art method ($\Omega$/sq.) |
| --- | --- | --- |
| Liquid crystal element 1 | 154 | 285 |
| Liquid crystal element 2 | 152 | 291 |
| Liquid crystal element 3 | 153 | 306 |
| Liquid crystal element 4 | 155 | N/A |
| Liquid crystal element 5 | 153 | 233 |

TABLE 2-continued

| | Present invention method (Ω/sq.) | Prior art method (Ω/sq.) |
|---|---|---|
| Liquid crystal element 6 | 153 | 247 |
| Liquid crystal element 7 | 152 | 253 |
| Liquid crystal element 8 | 154 | N/A |
| Liquid crystal element 9 | 154 | 342 |
| Liquid crystal element 10 | 152 | 299 |

Here, "N/A" means that the value was unmeasurable. As seen from Table 2, the liquid crystal elements with electrodes attached by the method of the present invention exhibited virtually no increase in surface resistivity even when bent 500 times, but the liquid crystal elements with electrodes attached by the method of the prior art had increased surface resistivity even after having been bent only 150 times.

Each of the electrode-attached liquid crystal elements were also subjected to flashing at 10 second intervals by application of a voltage of 60V AC and a voltage of 120V AC. The results are shown in Table 3. The results after application of a voltage of 60V AC are omitted because they were the same for the present invention method and the prior art method.

TABLE 3

| | Present invention method (10,000 times) | Prior art method (10,000 times) |
|---|---|---|
| Liquid crystal element 1 | ≥52 (G) | ≤6 (P) |
| Liquid crystal element 2 | ≥52 (G) | ≤6 (P) |
| Liquid crystal element 3 | ≥52 (G) | ≤6 (P) |
| Liquid crystal element 4 | ≥52 (G) | ≤6 (P) |
| Liquid crystal element 5 | ≥52 (G) | ≤6 (P) |
| Liquid crystal element 6 | ≥52 (G) | ≤6 (P) |
| Liquid crystal element 7 | ≥52 (G) | ≤6 (P) |
| Liquid crystal element 8 | ≥52 (G) | ≤6 (P) |
| Liquid crystal element 9 | ≥52 (G) | ≤6 (P) |
| Liquid crystal element 10 | ≥52 (G) | ≤6 (P) |

As seen from Table 3, the liquid crystal elements with electrodes attached by the method of the present invention flashed normally even after 520,000 times (2 months), whereas the liquid crystal elements with electrodes attached by the method of the prior art no longer flashed after 60,000 times (1 week).

As shown above, since the method for attaching an electrode to a liquid crystal element according to the present invention comprises an incision step in which an incision is made in the liquid crystal layer to form an opening in the surface of the liquid crystal layer while also forming a space connecting with the opening inside the liquid crystal layer, it is possible to form, inside the liquid crystal layer, a space to allow bonding of the electrode while it is sandwiched by the liquid crystal layer for attachment to the liquid crystal layer, and furthermore since it is not necessary to remove part of the liquid crystal layer, the thickness of the liquid crystal element is not reduced and it is thus possible to avoid reduction in strength of the liquid crystal element.

Moreover, since the method for attaching an electrode to a liquid crystal element of the present invention comprises an electrode insertion step in which at least a portion of the electrode is inserted into the space formed in the incision step, it is possible to contact both sides of the electrode with the liquid crystal layer.

In addition, since the method for attaching an electrode to a liquid crystal element of the present invention comprises a bonding step in which the electrode and liquid crystal layer are bonded with at least a portion of the electrode inserted into the space in a manner sandwiched by the liquid crystal layer, cracking is unlikely to occur from the sections where the incision has been made in the liquid crystal layer.

Since the method for attaching an electrode to a liquid crystal element of the present invention allows the electrode to be attached by these three steps which do not involve removal of a part of the liquid crystal layer or coating of a conductive paste, it allows the processing steps to be simplified.

In addition, since the method for attaching an electrode to a liquid crystal element of the present invention allows attachment of the electrode without removing part of the conductive film-attached substrate or part of the liquid crystal layer, or coating a conductive paste, it allows the electrode to be attached regardless of the technical skill of the operator.

Furthermore, since the method for attaching an electrode to a liquid crystal element of the present invention does not involve removal of part of the conductive film-attached substrate or part of the liquid crystal layer using an alcohol solvent, and consequent exposure of the conductive film, it is possible to avoid damaging the conductive film and the conductive film is less likely to come into contact with fats or oils, moisture or oxygen-containing gas, thereby reducing degradation of the conductive film.

The method for attaching an electrode to a liquid crystal element of the present invention also allows the strength of the liquid crystal element to be maintained since it does not involve removal of part of the conductive film-attached substrate or part of the liquid crystal layer.

A liquid crystal element obtained by the method for attaching an electrode to a liquid crystal element of the present invention can be used in office partitionings, home window glass, home theater video screens and window glass for automobiles or transport craft such as aircraft.

What is claimed is:

1. A method for attaching an electrode to a liquid crystal element comprising:
   an incision step in which an incision is made in a liquid crystal layer that is capable of being disposed between a pair of substrates to which electrically conductive films have been attached, to form an opening in the surface of the liquid crystal layer while also forming a space connecting with the opening inside the liquid crystal layer,
   an electrode insertion step in which at least a portion of an electrode is inserted into the space formed in the incision step, and
   a bonding step in which the electrode and the liquid crystal layer are bonded with at least a portion of the electrode that has been inserted into the space being sandwiched by the liquid crystal layer.

2. The method for attaching an electrode to a liquid crystal element according to claim 1, wherein:
   in the incision step, a blade having a cutting edge that extends from the blade tip is inserted into the liquid crystal layer disposed between the pair of substrates, or in the liquid crystal layer before it is disposed between the pair of substrates, with the cutting edge oriented from the blade tip toward the same direction in which the substrate extends, and the blade is moved in the direction in which the cutting edge is facing while the blade is inserted to make an incision in the liquid crystal layer.

3. The method for attaching an electrode to a liquid crystal element according to claim 1, wherein:
   in the incision step, the opening is formed in the surface of the liquid crystal layer in a manner approximately perpendicular to the surface of the liquid crystal layer, toward the substrate.

4. The method for attaching an electrode to a liquid crystal element according to claim 1, wherein:
   the electrode has a flat main body, and a bonding agent that is disposed on the outer side of the main body and comprises a conductive substance.

5. The method for attaching an electrode to a liquid crystal element according to claim 4, wherein:
   the main body of the electrode is a resin film,
   the conductive substance is a conductive binder, and
   the binder includes a core material formed of graphene.

* * * * *